April 25, 1967 B. V. BARLOW 3,315,509
MANUFACTURE OF TUBE-LIKE STRUCTURES
Filed Nov. 5, 1963 3 Sheets-Sheet 1
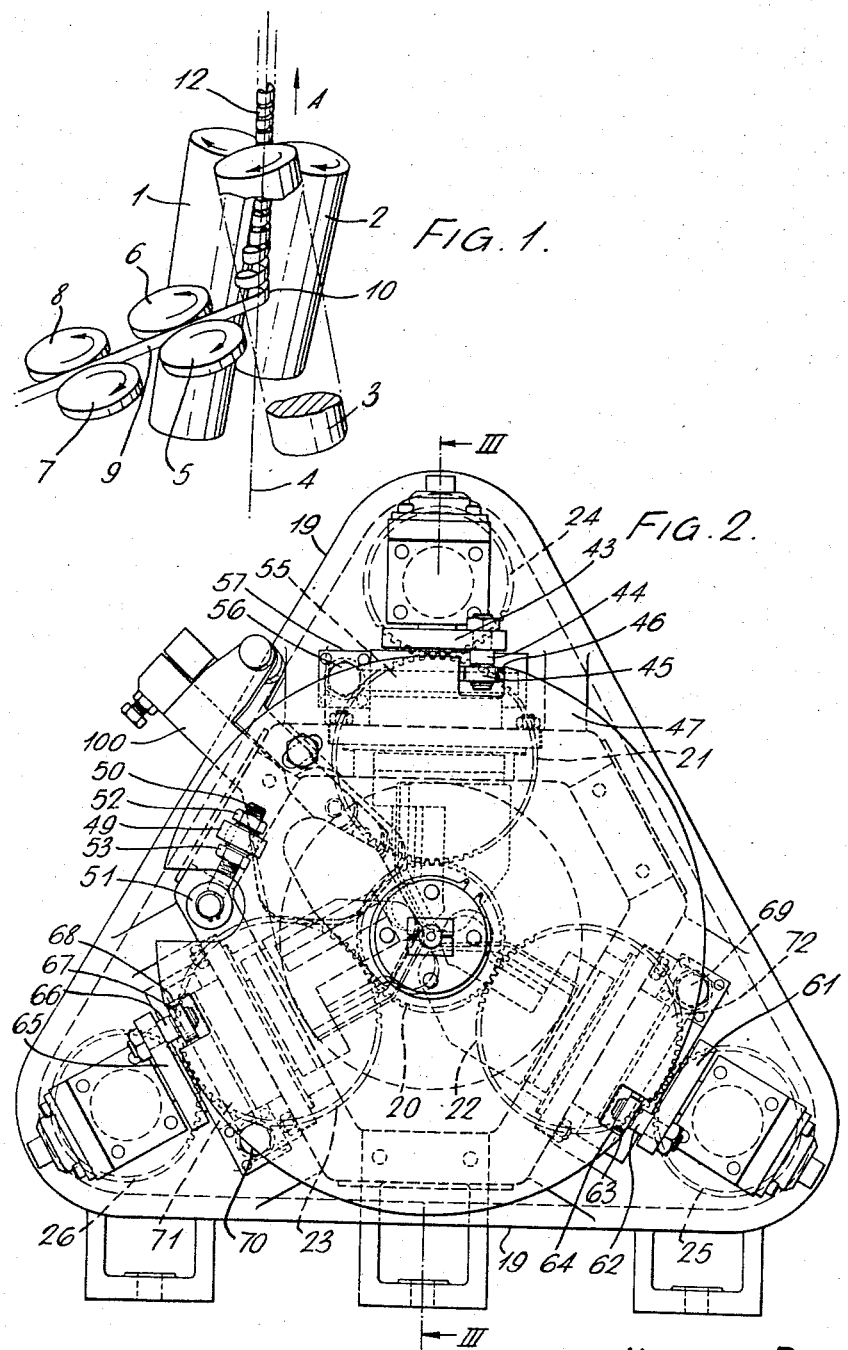

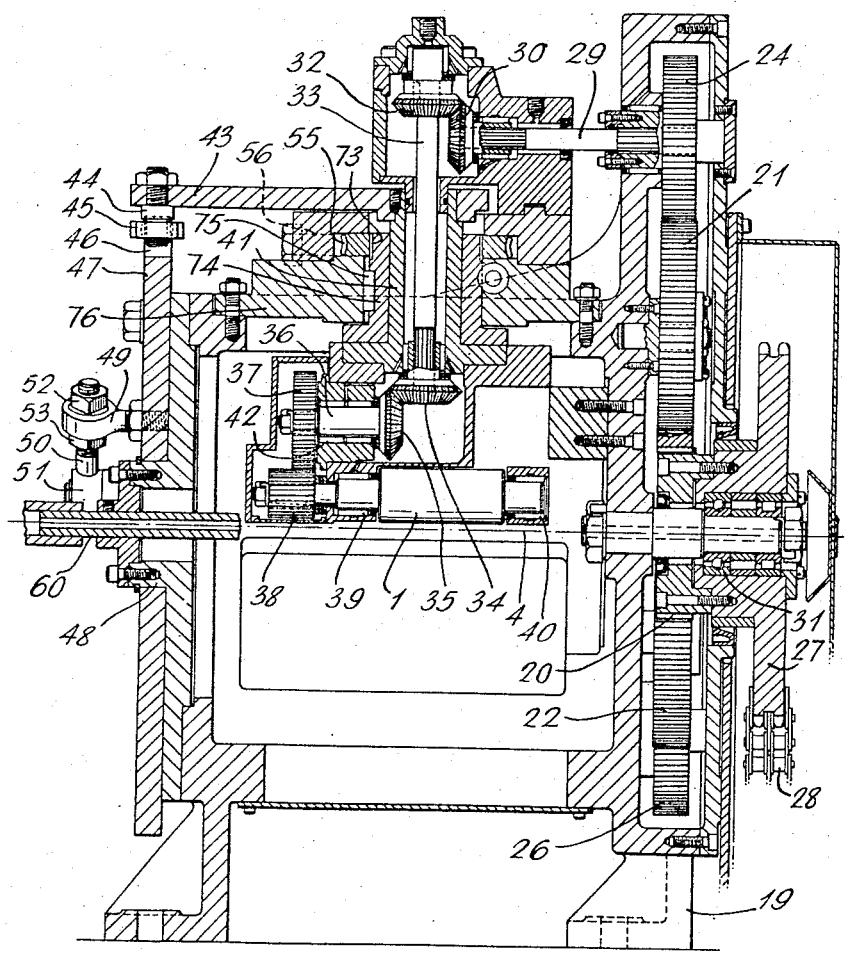

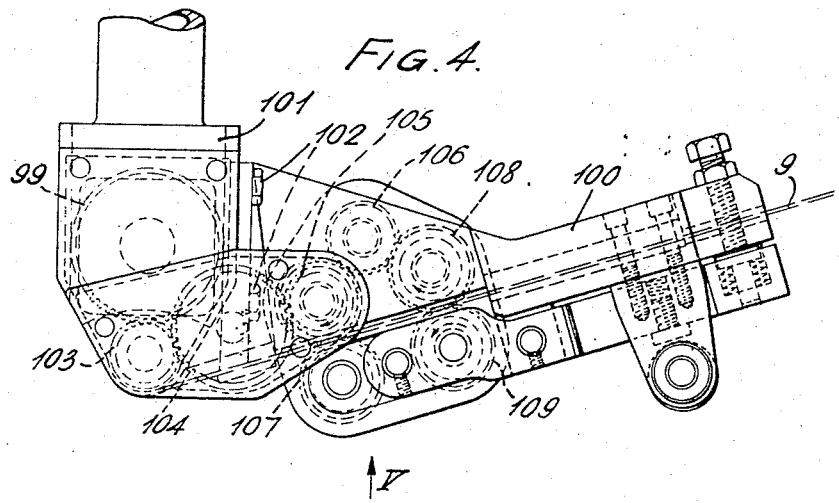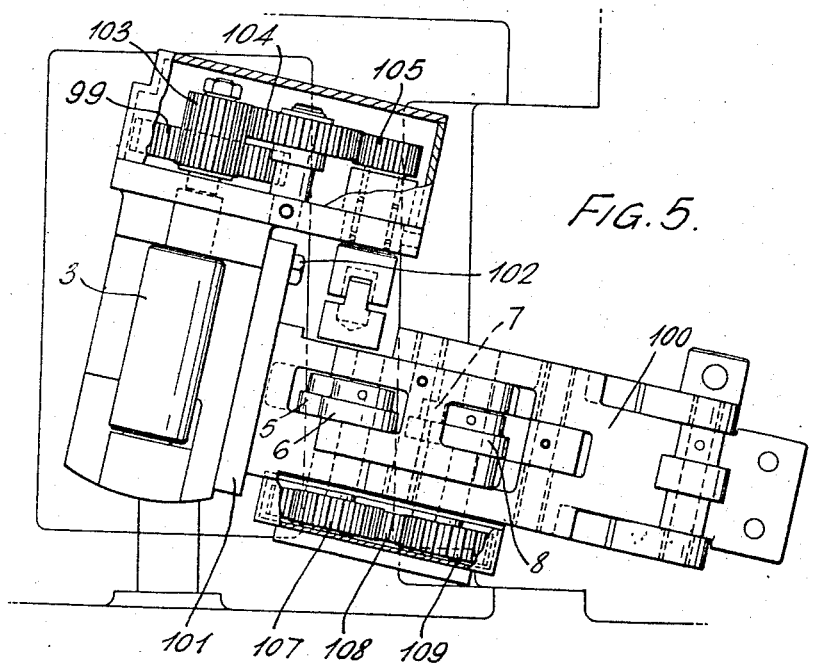

United States Patent Office 3,315,509
Patented Apr. 25, 1967

3,315,509
MANUFACTURE OF TUBE-LIKE STRUCTURES
Boris Victorien Barlow, Edgware, Middlesex, England, assignor to S. Smith & Sons (England) Limited, Cricklewood Works, London, England, a British company
Filed Nov. 5, 1963, Ser. No. 321,570
Claims priority, application Great Britain, Nov. 7, 1962, 42,024/62
16 Claims. (Cl. 72—145)

This invention relates to methods and apparatus for manufacturing tube-like structures by winding wire helically with consecutive turns touching one another or being spaced apart axially, and is more particularly directed to the manufacture of such tube-like structures from relatively stiff wire, such as hardened steel wire. The wire used in the winding operation may be flat or of any other desired cross-section. The manufactured structures (which for convenience will be referred to as "tubes") are employed particularly as outer members for flexible drive shafts.

One object of the present invention resides in the provision of a method of manufacturing of a tube of the kind referred to, comprising the steps of drawing wire from a reel and driving the wire under force into a space formed between two or more rollers skewed similarly about an axis and driven synchronously in the same direction. The wire is driven into said space in a plane substantially at right angles to the axis of the roller with which it first comes into contact and spaced apart from the throat of the rollers, whereby a helical form is imparted to the wire by the roller with which it first comes into contact. The tube thus formed is driven towards the throat of the rollers by engagement with the rotating rollers, the radius of the tube being progressively reduced until it reaches the throat. The "throat" of two or more rollers, similarly skewed about an axis, is the region in which the surfaces of the rollers lie closest to the axis. Preferably there are three rollers of uniform cross-section.

Another object of the present invention resides in the provision of a novel apparatus for manufacturing, a tube of the kind referred to, comprising two or more rollers skewed similarly about an axis, and, in operation, driven synchronously in the same direction. The apparatus further comprises means to draw wire from a reel and to drive it under force into the space formed between the rollers, in a plane substantially at right angles to the axis of the roller with which the wire first comes into contact and spaced apart from the throat of the rollers.

The apparatus of the present invention preferably comprises three rollers of uniform cross-section. The said means to draw and drive wire preferably comprise feed rollers which in operation are driven together with the skewed rollers; and said feed rollers are preferably driven, through a gear train, by a gear mounted for rotation together with the roller with which the wire first comes into contact. The feed rollers are preferably so disposed that, when they draw and drive wire which has an approximately rectangular cross-section with the major sides of the rectangle in contact with the surfaces of the feed rollers, one of the said major sides comes into contact with the said roller with which the wire first comes into contact.

Preferably the apparatus also comprises adjusting means to adjust the angles at which the rollers are skewed about the said axis. The apparatus also preferably comprises further adjusting means for adjusting the distance between the surface of each of the skewed rollers and the said axis at the throat.

A further object of the present invention resides in the provision of a tube of the kind of referred to, manufactured by the method defined above.

The manufacture of the outer member for flexible drives (which is an example of a tube of the kind referred to), and apparatus for such manufacture in accordance with this invention, will now be described with reference to the accompanying drawings in which:

FIGURE 1 is a schematic cut away perspective view of a set of skew rollers and a set of feed rollers.
FIGURE 2 is a plan view of the apparatus.
FIGURE 3 is a section along the line III—III in FIGURE 2 showing the drive arrangements for only one of the rollers.
FIGURE 4 shows the drive arrangements for the feed rollers.
FIGURE 5 is a side view of the drive arrangements for the feed rollers as seen from the arrow V in FIGURE 4.

Referring to FIGURE 1, three similar forming rollers 1, 2 and 3 are symmetrically skewed about an axis 4. The forming rollers 1, 2 and 3 are of a uniform cross-section, and are driven in the clockwise direction at the same rotational speed about their axes by means described below. Four feed rollers 5, 6, 7 and 8 are driven together with the rollers 1, 2, and 3 through gearing (described below). Hardened steel wire 9 is drawn from a reel (not shown) by the feed rollers 5, 6, 7 and 8, and said wire is driven with a small force into the space between the forming rollers 1, 2 and 3, in a plane at right angles to the axis of the roller 3. The wire 9 is approximately rectangular in shape and has its major sides in contact with feed rollers 5, 6, 7 and 8, and is pressed by them into contact with the forming roller 3 with one of its major sides in contact with the surface of the forming roller 3. The forming roller 3 deflects wire 9 tangentially towards the forming roller 2 and also deflects the wire 9 axially in the direction of the arrow A thereby forming a helical turn 10. The newly formed helical turns are moved axially (in the direction of the arrow A) by the forming rollers 1, 2 and 3, and said turns are compressed radially during this axial movement until they reach the throat of the forming rollers 1, 2 and 3 where the forming roller surfaces lie closest to the axis 4. The wire 9 then issues from the throat of the forming rollers 1, 2 and 3 wound helically and rotating about the axis 4, and is then in a tubular form suitable for use as an outer member for flexible drives. The helically wound tubular member is indicated at 12. The diameter of the tubular member 12 leaving the forming rollers 1, 2 and 3 is dependent on the diameter of the throat, that is to say on the smallest distance from the forming roller surfaces to the axis 4. The helical angle of the wire 9 is dependent on the angle of the skew of the forming rollers 1, 2 and 3. The surface of the wire 9 is work hardened by the forming rollers 1, 2 and 3.

A practical form of the apparatus, shown illustratively in FIGURE 1, is depicted in FIGURES 2 through 5, inclusive. Referring now to FIGURE 2, the apparatus has a generally triangular framework 19 and carries, at its center, a gear wheel 20 (disposed at the side opposite to that of the view shown in FIGURE 2) which is rotatable on bearings 31 and is driven through a sprocket 27 and chain 28 (see FIGURE 3) by an electric motor (not shown). The gear wheel 20 drives three idler spur gears 21, 22 and 23 which in turn drive three further spur gears 24, 25 and 26 respectively. FIGURE 3 shows the drive arrangement for the roller 1 in greater detail. The gear 24 is splined to a shaft 29, as is a bevel gear 30 which meshes with a further bevel gear 32. The bevel gear 32 is rigidly fixed to a shaft 33 which is at right angles to the shaft 29 and to which is splined a bevel gear 34. The bevel gear 34 meshes with a further bevel gear 35 rigidly fixed to a shaft 36 which is rotatable within a bearing 42 and lies at right angles to the shaft 33. A gear wheel 37 is fixed to the shaft 36 and meshes with a spur gear 38. The spur gear 38 drives one end of the forming roller 1 (which is shown in FIGURE 3 with its axis parallel to the axis 4 and not skewed about it). Said one end of roller 1 is rotatable in a bearing 39. The other end of the forming roller 1 is rotatable in a bearing 40.

The gear 35, shaft 36, gear 37, gear 38, bearing 39, and a shaped member 41 which carries the bearing 42' are rotatable together about the axis of the shaft 33. An arm 43 has one end thereof screwed to the member 41, and carries at its other end a bolt 44 and a nut 45 which fit into a slot 46 in a plate 47. Plate 47 is rotatably mounted about a projecting bearing 48 at the center of the framework 19. The plate 47 carries a locating eye-bolt 49 which has a spherical bearing through which a bolt 50 passes. The bolt 50 is attached by a spherical bearing to a projection 51 of the framework 19 and carries two nuts 52 and 53. The eye-bolt 49 may be moved along the bolt 50, rotating the plate 47 about the bearing 48 and rotating arm 43 and the member 41 about the axis of the shaft 33. The gear 35, shaft 36, gear 37, gear 38 and the bearing 39 are then similarly rotated about the axis of the shaft 33, the teeth of the gear 35 remaining in mesh with those of the gear 34.

The member 41 is surrounded by a sleeve 74 which is held against rotation by a key 75 projecting from a portion 76 of the framework 19. The sleeve 74 is provided with an external thread 73 onto which a worm wheel 55 provided with an internal screw thread is screwed. The worm wheel 55 is engaged by a worm 56. As the worm 56 is rotated, the worm wheel 55 is rotated about the axis of the shaft 33. The sleeve 74, which is held against rotation, is moved along the shaft 33 and moves the member 41. The member 41 carries with it the gears 34 and 35, the shaft 36, the gears 37 and 38 and the bearing 39. The gear 34 is splined to the shaft 33 so that it is permitted to move axially with respect to it.

Thus the forming roller 1 may be skewed about the axis 4 by rotating the bearing 39 about the axis of the shaft 33 in the same manner described. The smallest distance of the surface of the forming roller 1 from the axis 4 may be adjusted by moving the bearing 39 in the direction parallel to the axis of the shaft 33 in the manner described.

The gears 25 and 26 drive the forming rollers 2 and 3, respectively, through gearing arrangements identical to those described between 24 and the roller 1. As shown in FIGURE 1, an arm 61, a bolt 62, and a nut 63 co-operate with a slot 64 in the plate 47 to skew the roller 2 about the axis 4 when the plate 47 is rotated about the bearing 48. An arm 65, a bolt 66, a nut 67 and a slot 68 in the plate 47 perform a similar function for the roller 3. Worms 69 and 70 co-operate with worm wheels 72 and 71 respectively and may be operated to adjust the smallest distance of the surface of the forming rollers 2 and 3 respectively from the axis 4 in the same manner that the worm 56 may be operated.

The gearing to drive the feed rollers 5, 6, 7 and 8 and the feed rollers 5, 6, 7 and 8 themselves are held in a structure 100 which is bolted by bolts 102 to a member 101 which is the equivalent, in the drive arrangement to the forming roller 3, of the member 41 in the drive arrangements to the forming roller 1.

The structure 100 is shown in FIGURES 4 and 5. A gear 99 (the equivalent of the gear 37) meshes with a spur gear 103 (the equivalent of the gear 38) which drives the forming roller 3. The gear 103 engages an idler gear 104 which engages a gear 105 which is coaxial with and drives the feed roller 5. The feed roller 5 carries a gear at its other end (the gear is obscured in FIGURES 4 and 5) which engages an idler gear 106 and a gear 107 which is coaxial with and drives the feed roller 6. The gear 108 drives a gear 109 which is coaxial with and drives the feed roller 8. The feed rollers 5, 6, 7 and 8 rotate in the direction of the arrows shown in FIGURE 1, and drive the wire 9 under a small force against the forming roller 3. When the forming rollers 1, 2 and 3 are skewed about the axis 4 in the manner described, the structure 100 rotates together with the forming roller 3 so that the wire 9 enters the space between the forming rollers 1, 2 and 3 in a plane which is at right angles to the axis of the forming roller 3.

As shown in FIGURE 3, a hollow cylinder 60, lying along the axis 4, passes through the bearing 48 of the apparatus. The helically wound tubular member 12 formed during operation of the apparatus issues through the hollow cylinder 60.

In use, the angle of skew of the forming rollers 1, 2 and 3 about the axis 4 is set by adjusting the position of the eye-bolt 49 along the bolt 50. The diameter of the throat of the forming rollers 1, 2 and 3 is set by adjusting the worms 56, 69 and 71 to the required position. The feed rollers 5, 6, 7, and 8 and the forming rollers 1, 2, and 3 are all driven through the gearing described, drawing the wire 9 from the reel and forming it into a tube-like member 12 which issues through the hollow cylinder 60.

The tube-like member 12 manufactured by the apparatus described has its surface work hardened by the rollers 1, 2 and 3. Its appearance is slightly different from outer flexible drive members manufactured by conventional apparatus in that it is slightly more shiny.

The whole apparatus, including the reel on which the wire is wound, may be rotated in a direction opposite to the direction of rotation of the tubular member 12 as it issues from the cylinder 60, and at the same angular velocity, so that the member 12 does not rotate with respect to the earth as it leaves the apparatus. This greatly facilitates continuous production.

I claim:

1. A method of manufacturing a helical wound wire tube-like structure the helical turns of which are in the same cylindrical plane comprising the steps of drawing wire from a reel and driving the wire under force into a space formed between at least two cylindrical rollers of uniform cross-section skewed similarly about an axis to form a throat and driven synchronously in the same direction, said wire being driven into said space in a plane substantially at right angles to the axis of the roller with which the wire first comes into contact and at a location spaced apart from the throat of the rollers, whereby a helical form is imparted to the wire by the roller with which said wire first comes into contact to form a tube, the tube thus formed being driven toward the throat of the rollers by engagement with the rotating rollers, the radius of said tube being progressively reduced by said skewed rollers until said tube reaches the throat.

2. A method as claimed in claim 1 wherein there are three rollers skewed similarly about an axis.

3. Apparatus for the manufacture of a tube-like structure formed by winding wire helically, with the helical turns in the same cylindrical plane, comprising at least two spaced forming rollers skewed similarly about an axis to form a throat, said rollers being cylindrical and of uniform cross-section, means for driving said rollers synchronously in the same direction and feed means for drawing wire from a reel and operative to drive said wire under force into the space formed between said roller at substantially right angles to the axis of the roller with which the wire first comes into contact and at a location spaced apart from the throat of said rollers.

4. Apparatus as claimed in claim 3 which comprises three forming rollers skewed similarly about said axis.

5. Apparatus as claimed in claim 3 wherein said feed means comprise a plurality of feed rollers, and means for driving said feed rollers together with said skewed forming rollers.

6. Apparatus as claimed in claim 5 wherein said feed means comprise four feed rollers.

7. Apparatus as claimed in claim 5 wherein said feed rollers are driven through a gear train by a gear mounted for rotation together with the forming roller with which said wire first comes into contact.

8. Apparatus as claimed in claim 5 wherein said feed rollers draw and drive wire which has an approximately rectangular shape with the major sides of the rectangle being in contact with the surfaces of said feed rollers, said feed rollers being so positioned relative to said forming rollers that one of the said major sides of said wire comes into contact with the said forming roller with which the wire first comes into contact.

9. Apparatus as claimed in claim 3 comprising bearing means carrying the said forming rollers, and adjustable positioning means operable on said bearing means to adjust the angle at which said forming rollers are skewed about said axis.

10. Apparatus as claimed in claim 3 comprising bearing means carrying said forming rollers, corresponding first ends of said forming rollers being angularly fixed about said axis, and a supporting member connected to the other ends of said forming rollers, said supporting member being rotatable over a range of angular positions about the said axis whereby the angle at which the said forming rollers are skewed about said axis may be adjusted by altering the angular position of the said supporting member.

11. Apparatus as claimed in claim 7 comprising bearing means carrying said forming rollers, and adjustable positioning means operable on said bearing means to adjust the angle at which the said forming rollers are skewed about the said axis.

12. Apparatus as claimed in claim 7 which also comprises bearing means carrying the said forming rollers corresponding first ends of said forming rollers being angularly fixed about the said axis, and a member to which the corresponding opposite ends of said forming rollers are connected, said member being rotatable over a range of angular positions about said axis whereby the angle at which said forming rollers are skewed about said axis may be adjusted by altering the angular position of said member.

13. Apparatus as claimed in claim 12 wherein said bearing means comprise a structure carrying the forming roller with which the wire first comes into contact, and also carrying said gear train and said feed rollers, said structure being moved when the angular position of said member is adjusted so that said wire is always driven into said space at right angles to the axis of the said forming roller with which the wire comes into contact.

14. Apparatus as claimed in claim 3 which also comprises bearing means carrying the said forming rollers, and adjustable positioning means operable on said bearing means to adjust the distance between said axis and the surfaces of said skewed foaming rollers at said throat.

15. Apparatus as claimed in claim 5 which also comprises bearing means carrying said forming rollers, and adjustable positioning means operable on said bearing means to adjust the distance between the surfaces of said forming rollers and said axis at said throat.

16. Apparatus as claimed in claim 9 which also comprises further adjusting means operable on said bearing means to adjust the distance between the surfaces of said forming rollers and said axis at said throat.

References Cited by the Examiner

UNITED STATES PATENTS

| 1,117,686 | 11/1914 | McMurtrie | 72—135 |
| 2,069,052 | 1/1937 | Webb | 72—145 |
| 2,643,698 | 6/1953 | Crooker | 72—145 |

FOREIGN PATENTS 1,195,612  5/1959  France.

CHARLES W. LANHAM, *Primary Examiner.*

RICHARD J. HERBST, *Examiner.*

L. A. LARSON, *Assistant Examiner.*